United States Patent [19]

Schmidt et al.

[11] Patent Number: 5,076,247
[45] Date of Patent: Dec. 31, 1991

[54] AUTOMATIC CARBURETOR AIR PREHEAT SYSTEM

[75] Inventors: Thomas A. Schmidt, Eden Prairie; David A. Overland, Cedar; Paul F. Huffman, Blaine, all of Minn.

[73] Assignee: Onan Corporation, Minneapolis, Minn.

[21] Appl. No.: 600,532

[22] Filed: Oct. 19, 1990

[51] Int. Cl.$^5$ .................................. F02M 31/00
[52] U.S. Cl. .................... 123/556; 290/1 A; 290/1 B
[58] Field of Search .................... 123/556, 198 E; 290/1 A, 1 B

[56] References Cited

U.S. PATENT DOCUMENTS

| | | |
|---|---|---|
| 2,080,272 | 5/1937 | Hollman . |
| 2,781,032 | 2/1957 | Sebok et al. . |
| 3,092,142 | 6/1963 | Willson . |
| 3,513,817 | 5/1970 | Kearsley . |
| 3,757,752 | 9/1973 | Holker . |
| 3,913,544 | 12/1975 | Fyie . |
| 3,974,808 | 8/1976 | Heitert . |
| 3,989,186 | 11/1976 | McMichael ............ 123/556 |
| 4,144,857 | 3/1979 | Bendig et al. . |
| 4,161,930 | 7/1979 | Bendig et al. . |
| 4,175,524 | 11/1979 | Coddington . |
| 4,206,732 | 6/1980 | Ludwig . |
| 4,231,343 | 11/1980 | Alf et al. . |
| 4,244,343 | 1/1981 | Yamaguchi et al. . |
| 4,249,500 | 2/1981 | Behrendt et al. . |
| 4,430,981 | 2/1984 | Thomas et al. . |
| 4,526,156 | 7/1985 | Briche . |
| 4,545,357 | 10/1985 | Kearsley et al. ......... 123/556 |
| 4,565,176 | 1/1986 | Alf et al. ................ 123/556 |
| 4,622,923 | 11/1986 | Nishimura et al. ....... 290/1 B |
| 4,632,084 | 12/1986 | Eriksson .................. 123/556 |
| 4,677,940 | 7/1987 | Bracht et al. ............. 290/1 A |
| 4,846,136 | 7/1989 | Phillips . |

OTHER PUBLICATIONS

General Motors Product Facts Publication, "AC Air Cleaners, Passenger Car and Light Duty Truck", 3 pgs., dated May 1986 (Exhibit A).
Onan Corp., Parts Manual, "BGE/BGEL Emerald I Gen Set, RV Electric Generating Set", pp. 12 & 13, dated 12/87; (Exhibit B: parts manual and prod. dwgs.) with accompanying production drawings.
"Cover, Air Inlet", drawing no. 145-0561, rev. D3, sheet 1 of 1, original drawing date 3/12/84.
"Rod, Air Inlet", drawing no. 145-0562, rev. C2, sheet 1 of 1, original drawing date 3/14/84.
"Housing, Air Cleaner", drawing no. 140-1894, rev. C1, sheet 1 of 1, original drawing date 4/14/83.

Primary Examiner—Andrew M. Dolinar
Assistant Examiner—M. Macy
Attorney, Agent, or Firm—Merchant, Gould, Smith, Edell, Welter & Schmidt

[57] ABSTRACT

An enclosed generator set (10) is provided having an engine (12) and a generator (14). An air cleaner preheater assembly (60) is in airflow communication with a source of ambient air and a source of preheated air to supply the engine (12) with air for use in the combustion process. The air cleaner preheater assembly (60) attaches to a bulkhead (28) which defines an ambient air compartment (36) and a preheated air compartment (38) on the generator set (10). An ambient air passage (68) and a preheated air passage (72) pass through a wall of air cleaner preheater assembly (60). A door (82) is pivotally mounted about an axis of rotation (86) perpendicular to a major surface of the door. The door (82) is variably positioned by a bimetal spring (110) between a first position wherein preheated airflow into the air cleaner preheater assembly (60) is at a maximum and a second position wherein ambient airflow into the air cleaner preheater assembly is at a maximum.

26 Claims, 4 Drawing Sheets

AUTOMATIC CARBURETOR AIR PREHEAT SYSTEM

FIELD OF THE INVENTION

This invention relates generally to an automatic air preheat system for regulating the temperature of air supplied to a carburetor of an internal combustion engine. In particular, this invention relates to a generator set having an automatic air preheat system supplying preheated air to the carburetor when the air temperature sensed falls below a predetermined temperature.

BACKGROUND OF THE INVENTION

Internal combustion engines will often not perform well as the temperature of the air supplied to the carburetor falls below certain temperatures. For example, engine efficiency may decrease because the fuel may not mix properly with the air and ice may form in the carburetor. To improve engine performance and eliminate carburetor icing, preheated air having a temperature greater than the ambient air temperature is supplied to the carburetor. The supply of preheated air is sometimes regulated because engine performance may also decrease, including problems with power losses and vapor lock conditions, if the air supplied to the carburetor is too warm.

Various systems are known which provide preheated air to the air inlet to the carburetor. In some systems, a housing may be provided having two inlets and an outlet to the air inlet of the carburetor. In those systems, one inlet to the housing is typically connected to a source of ambient air and the other inlet to the housing is connected to a source of preheated air. In some of these systems, the relative amounts of ambient air and preheated air which enter the carburetor are adjustable. Some systems are manually controlled and others are automatically controlled.

One problem with some manual systems is that there is often only a two position switch on the housing which must be manually moved as the temperature of the ambient air changes. Failure to properly move the switch can cause problems affecting engine performance if the air entering the carburetor is either too warm or too cold.

Some of the automatic systems vary the relative amounts of ambient air and preheated air which enter the carburetor by positioning a door or flap in the housing in varying positions depending upon the air temperature sensed. Some previous systems employ a rotatably mounted door which pivots on a vertical axis of rotation parallel to a major surface of the door and located adjacent at an edge of the door. One problem with this type of system is that extra space must be provided within the housing to accommodate movement of the door about its axis of rotation between the various positions.

Another problem with some automatic systems is that they may employ intricate structure to regulate the amount of ambient air and preheated air supplied to the carburetor. For example, some prior systems employ pneumatically operated devices to move a door or doors to regulate the ambient air supply and the preheated air supply. Often the pneumatically operated systems employ temperature sensing devices to operate the pneumatic controls.

Some additional problems with some prior preheat systems occur when the internal combustion engine is used in connection with a generator set. A generator set generally includes an internal combustion engine which drives a generator for producing electrical energy to provide a self-contained power source. Often generator sets are provided as auxiliary power sources in applications such as recreational vehicles and ambulances. One consideration often emphasized with generator sets used in these applications is to minimize the size of the generator set while providing a preheat system that is simple to manufacture and to operate. Many existing preheat systems have bulky and complex door mechanisms and control mechanisms to move the door mechanisms to regulate relative amounts of ambient air and preheated air. Further, in some of these prior systems the preheated air supply employs an extra tube or duct which draws air heated by a specific portion of the engine and directs it into the housing and to the carburetor. The ambient air supply may in some instances employ a duct or tubing to draw ambient air from a particular location.

It is clear that there has existed a long and unfilled need in the prior art for a preheat system that automatically and variably regulates the temperature of air supplied to the carburetor without requiring excessive space or involving intricate structure. In addition, there is a need for an automatic preheat system for use on a generator set that does not significantly increase the size of the generator set nor involve complex and intricate parts. The present invention solves these and other problems associated with the prior art.

SUMMARY OF THE INVENTION

The present invention relates to an air inlet housing apparatus for regulating the temperature of air supplied to an internal combustion engine. The air inlet housing apparatus includes a housing having a preheated air passage and an ambient air passage passing through a substantially planar portion of the housing to an interior of the housing. The preheated air passage is connectable to a source of preheated air and the ambient air passage is connectable to a source of ambient air. The housing further has air passage outlet structure for connecting the interior of the housing to the carburetor of the engine. The air inlet housing apparatus also includes a door mounted to the housing with a substantially planar major surface adjacent the planar portion of the housing. The door is mounted for rotational movement about an axis of rotation perpendicular to the major surface of the door. The door is variably positionable between a first position where the door maximizes airflow through the preheated air passage and minimizes airflow through the ambient air passage, and the second position where the door maximizes airflow through the ambient air passage and minimizes airflow through the preheated air passage. Temperature responsive structure is provided for positioning the door such that the door is moved toward the first position as air temperature sensed decreases and the door is moved toward the second position as air temperature sensed increases.

The present invention also relates to an air cleaner preheater apparatus for regulating the temperature of air supplied to an internal combustion engine provided with a bulkhead with an inlet opening to a carburetor of the engine and a preheated air opening connectable to a source of preheated air. The air cleaner preheater apparatus includes a housing having a preheated air passage and an ambient air passage to an interior of the housing.

The ambient air passage is connected to a source of ambient air. The housing further has an open side which is engageable with the bulkhead. The open side has a perimeter surrounding the inlet opening to the carburetor and the preheated air opening to the source of preheated air. The preheated air passage is in airflow communication with the preheated air opening. The preheated air passage and the ambient air passage are in airflow communication through the housing to the inlet opening. The air cleaner preheater apparatus further includes door structure for opening and closing the preheated air passage and the ambient air passage.

The present invention further relates to a generator set including a generator which is mechanically driven by an engine having a carburetor with an air inlet. An enclosure assembly substantially encloses the generator and the engine and has an ambient air inlet from an exterior of the enclosure assembly to an interior of the enclosure assembly. A heated air outlet permits airflow to exit from the interior of the enclosure assembly to the exterior. A bulkhead cooperates with the enclosure assembly to form two compartments in the interior of the enclosure assembly. A first compartment is in airflow communication with the ambient air inlet and a second compartment is in airflow communication with the heated air outlet. The first compartment contains ambient air and the second compartment contains preheated air during operation of the generator set. Cooling structure is provided for moving a flow of air from the first compartment across the bulkhead to the second compartment. Air inlet structure is provided for supplying varying amounts of ambient air and preheated air to the air inlet to the carburetor. The air inlet structure is in airflow communication with the first compartment and the second compartment and has structure for varying the relative amounts of ambient air and preheated air entering the air inlet to the carburetor.

The present invention also relates to an air preheater system for regulating the temperature of air supplied to a carburetor of an internal combustion engine wherein the system includes a bulkhead with an inlet opening to a carburetor of the engine and a preheated air opening connectable to a source of preheated air. The air preheater system includes a housing having a preheated air passage and an ambient air passage to an interior of the housing. The ambient air passage is connected to a source of ambient air. The housing further has an open side which is engageable with the bulkhead. The open side has a perimeter surrounding the inlet opening to the carburetor and the preheated air opening to the source of preheated air. The preheated air passage is in airflow communication with the preheated air opening. The preheated air passage and the ambient air passage are in airflow communication through the housing to the inlet opening. The air preheater system further includes door structure for opening and closing the preheated air passage and the ambient air passage.

BRIEF DESCRIPTION OF THE DRAWINGS

In the drawings, wherein like reference numerals generally indicate corresponding parts throughout the several views.

DETAILED DESCRIPTION OF THE PREFERRED EMBODIMENT

Figure 1:
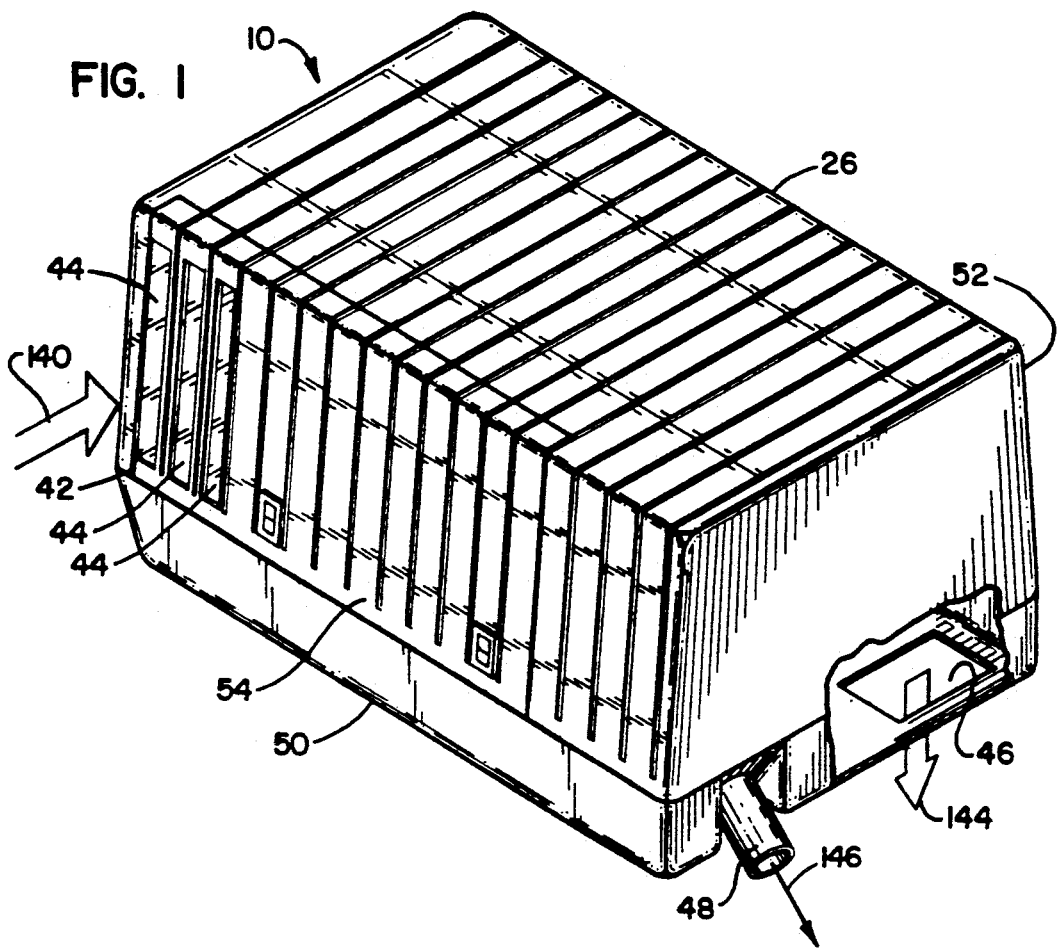
FIG. 1 is a perspective view of an embodiment of a generator set having an automatic preheat system according to the present invention, showing a portion of the enclosure assembly removed.
Figure 2:
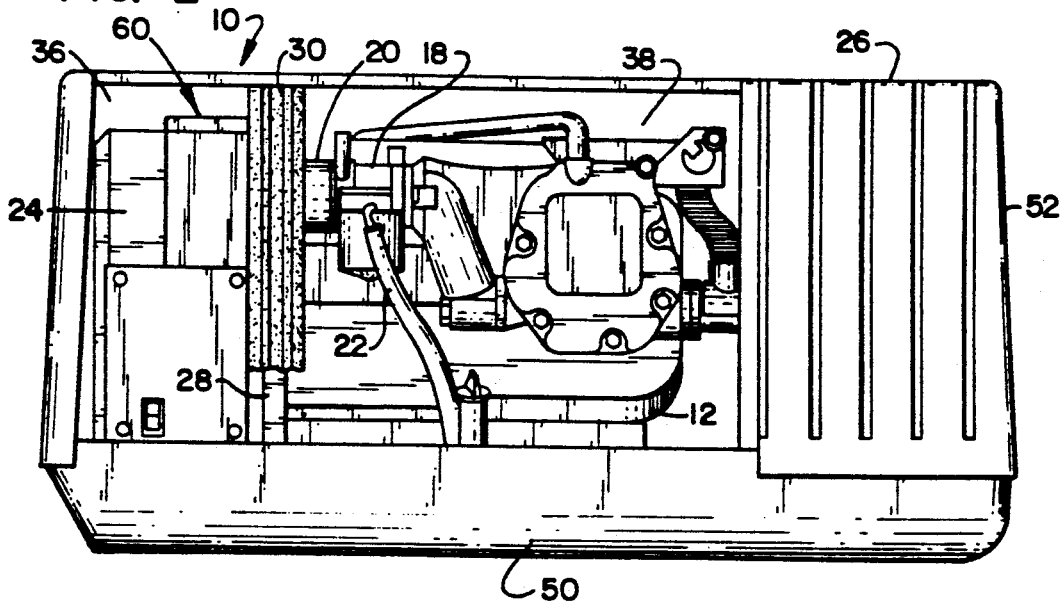
FIG. 2 is a front view of the generator set shown in FIG. 1 with the panel of the enclosure assembly removed.

Referring now to FIGS. 1-6, a preferred embodiment of a generator set 10 is shown according to the principles of the present invention. As best shown in FIG. 2 and in the schematic view of FIG. 7, the generator set 10 includes an internal combustion engine 12 which mechanically drives a generator 14 via shaft 16 for producing electrical energy. A carburetor 18 supplies the engine 12 with a mixture of air and fuel for use during the combustion process. Air enters the carburetor through an air inlet 20 of the carburetor 18 and fuel enters at a fuel inlet 22.

As best shown in FIGS. 1 and 2, the preferred embodiment of the generator set 10 includes an enclosure assembly 26 which substantially encloses the engine 12 and the generator 14. Preferably, the enclosure assembly 26 includes a five-sided top half 52 which cooperates with a tray 50 that the engine 12 and generator 14 rest to substantially enclose the engine 12 and generator 14. The enclosure assembly 26 may serve several functions including providing a more aesthetically pleasing generator set 10 and providing a barrier between the generator set 10 and its surroundings to insulate and protect the surroundings from the generator set 10 during operation. In the preferred embodiment, the enclosure assembly 26 also forms airflow pathways through the generator set 10 for cooling purposes and for supplying the engine 12 with preheated air when the ambient air temperature falls below predetermined temperatures. A panel 54 permits a portion of the top half 52 of enclosure assembly 26 to be removed to access an interior of enclosure assembly 26 without having to remove the entire top half.

Figure 3:
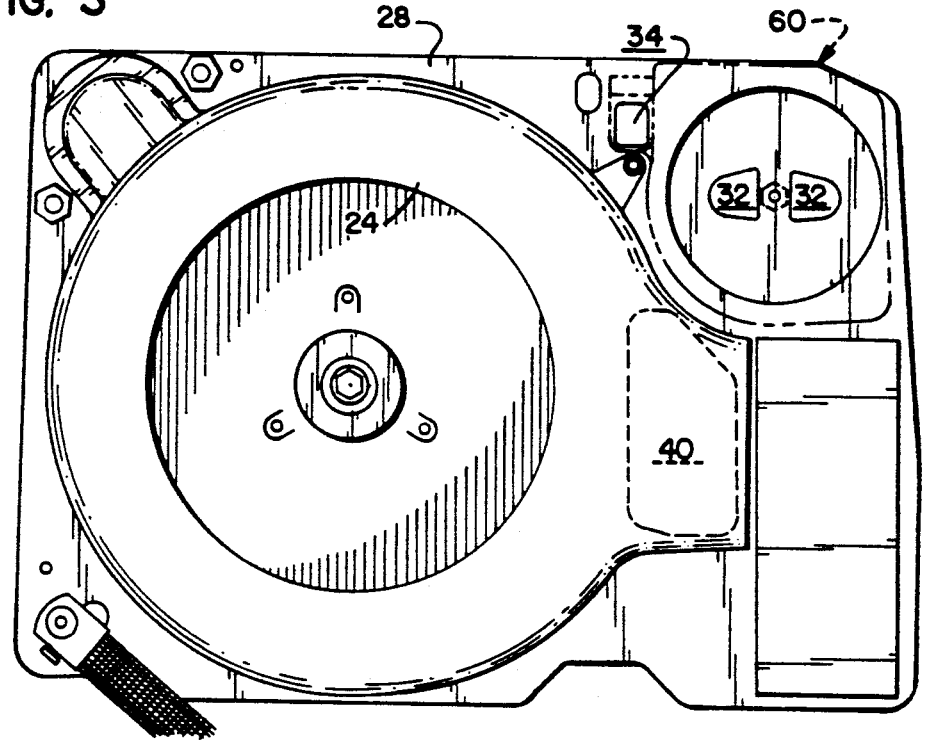
FIG. 3 is a left end view of the generator set shown in FIG. 1 without the top half of the enclosure assembly and showing an outline of the air cleaner preheater assembly represented by dashed lines.

Referring now to FIGS. 2 and 3, a bulkhead 28 is provided in an interior of enclosure assembly 26 to cooperate with enclosure assembly 26 to form two compartments. A first compartment 36 contains ambient air during operation of the generator set 10. As best shown in FIG. 1, an ambient air inlet 42 in the enclosure assembly 26 permits ambient air to enter the first compartment 36 from an exterior of the enclosure assembly 26. A second compartment 38 contains air heated by the engine 12 and generator 14, hereinafter referred to as "preheated air", during operation. The second compartment 38 is in airflow communication with a heated air outlet 46, shown in FIG. 1, passing through the tray 50 to link the second compartment 38 to the exterior of the enclosure assembly 26. Preferably, a seal member 30 is provided to seal between the enclosure assembly 26 and the bulkhead 28. As shown in FIG. 1, an exhaust air outlet 48 permits engine exhaust gases to exit from the engine 12 to the exterior of the enclosure assembly 26.

As will be discussed below, ambient air from the first compartment 36 is used to cool the engine 12 and generator 14 in the second compartment 38, and preheated air in the second compartment is exhausted via the heated air outlet 46. As will also be discussed below, ambient air from the first compartment 36 and preheated air in the second compartment 38 are both supplied in varying amounts to the air inlet 20 of the carburetor 18 of the engine 12 for use during the combustion process.

To cool the generator set 10 during operation, a fan 24 is provided to draw ambient air into the first compartment 36 through the ambient air inlet 42 and subsequently move the air across the bulkhead 28 through port 40 to cool the engine 12 and generator 14. The ambient air that enters the second compartment 38 becomes preheated air which is directed by the enclosure assembly 26 and the bulkhead 28 to exit the second compartment 38 via the heated air outlet 46. The presence of bulkhead 28 provides for more efficient cooling of the engine 12 and generator 14 by preventing preheated air from recirculating back through the fan 24 to be moved again across engine 12 and generator 14. The bulkhead 28 operates by substantially obstructing the preheated air from reentering the inlet to fan 24 and instead helps direct the preheated air to exit the enclosure assembly 26 via heated air outlet 46. Ambient airflow arrow 140, preheated airflow arrow 144, and engine exhaust airflow arrow 146 in FIG. 1 illustrate the airflow path from an exterior of the enclosure assembly 26 to an interior and from the interior to the exterior.

Referring now to FIGS. 2-6, an air cleaner preheater assembly or preheater 60 is provided adjacent air inlet 20 of carburetor 18. The preheater 60 is provided with structure for directing variable amounts of preheated air and ambient air to the air inlet 20 of the carburetor 18. Further, the preheater 60 is also provided with temperature responsive structure for automatically controlling or regulating relative amounts of preheated air and ambient air which are supplied to the air inlet 20 of the carburetor 18 based on temperature sensed such that the engine 12 is supplied with air having a greater temperature than the ambient air supplied to the engine when the temperature sensed falls below a predetermined temperature. In the preferred embodiment, the preheater 60 also has structure for filtering the air being supplied to the carburetor 18.

As shown in FIGS. 2-6, the preheater 60 includes a plurality of walls which form an air cleaner housing or housing 62 having an open side 64. The opens side 64 of the housing 62 cooperates with the bulkhead 28 to define an enclosed interior. The housing 62 can be made from any of a variety of materials including a molded plastic in the preferred embodiment.

Figure 4:
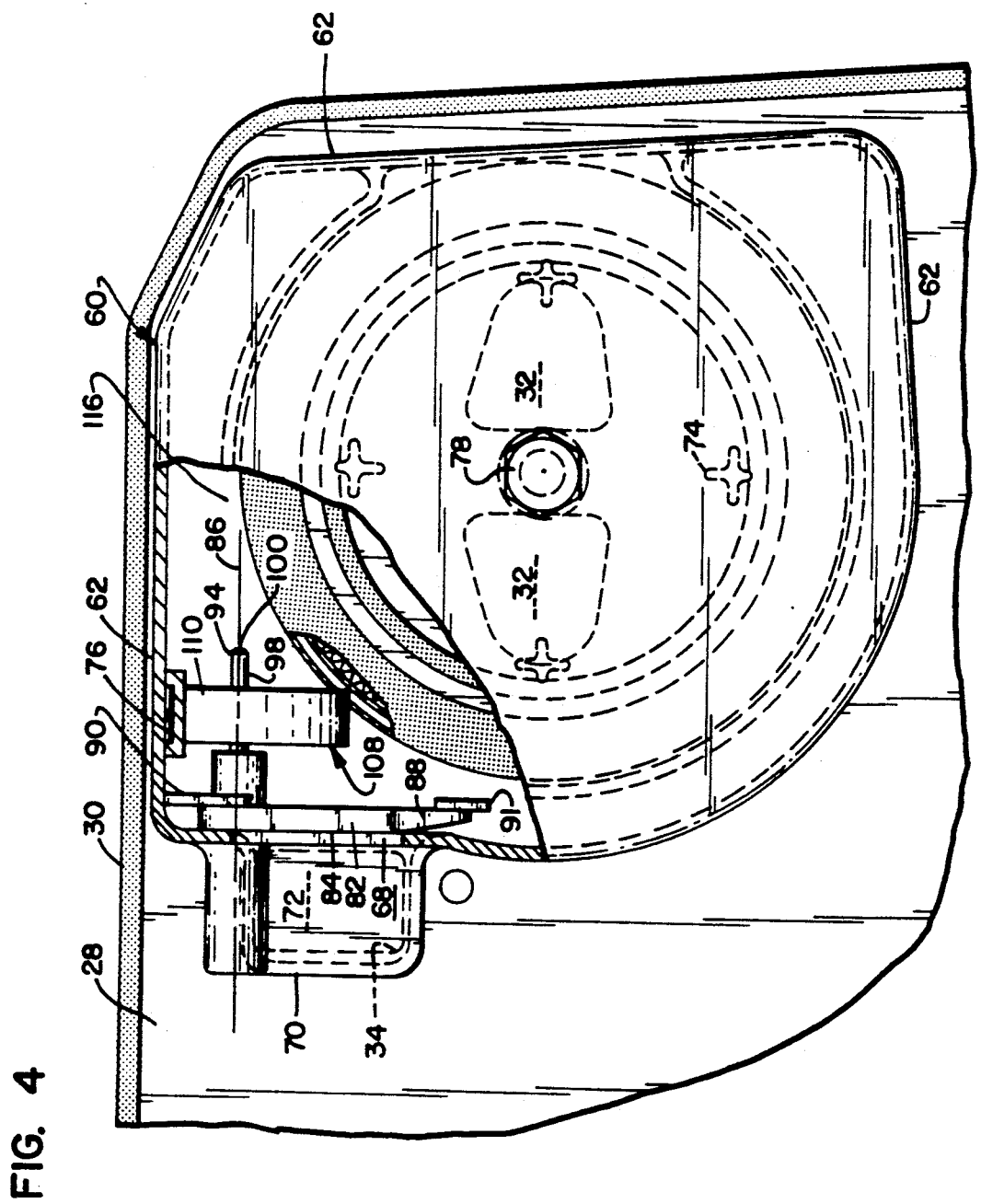
FIG. 4 is an enlarged portion of the left end view of the generator set shown in FIG. 3 showing the air cleaner preheater assembly mounted to the bulkhead.

The housing 62 preferably attaches to the bulkhead 28 with a screw 78 or other suitable mounting structure to hold the housing 62 against the bulkhead 28. As best shown in FIG. 3, the bulkhead 28 is provided with a substantially planar surface having a preheated air opening 34 passing through the bulkhead 28. The bulkhead 28 is further positioned such that it mounts against the air inlet 20 to carburetor 18. An inlet opening 32 through the bulkhead 28 permits airflow communication into the air inlet 20 of carburetor 18. The bulkhead shown has two inlet openings 32. The open side 64 of the housing 62 has a perimeter which engages bulkhead 28 and surrounds both the inlet openings 32 and the preheated air opening 34 as best shown in FIGS. 3 and 4. When the housing 62 is mounted to the bulkhead 28, a preheated air extension 70 to the housing 62 cooperates with the bulkhead 28 to form a preheated air passage 72 to link the interior of the housing 62 to the second compartment 38 via the preheated air opening 34 through the bulkhead 28. The interior of the housing 62 is also in airflow communication with the first compartment 36 via an ambient air passage 68 through the housing 62. The interior of the housing 62 is further in airflow communication with the air inlet 20 of carburetor 18 via the inlet openings 32 bulkhead 28. In this manner, ambient air and preheated air are supplied to the engine 12.

In the preferred embodiment, the generator set 10 does not employ any duct or tubing to connect the preheated air opening 34 to a particular location on engine 12 or generator 14. Instead, preheated air is drawn from the second compartment 38 into the housing 60 through the preheated air opening 34. Further, no duct or tubing is needed for the ambient air passage 68 since it opens to the first compartment 36 which contains ambient air during operation. Because no duct or tubing is needed for the preheater 60, one advantage the preferred generator set 10 has is that it is more compact and requires less materials to manufacture.

Figure 5:
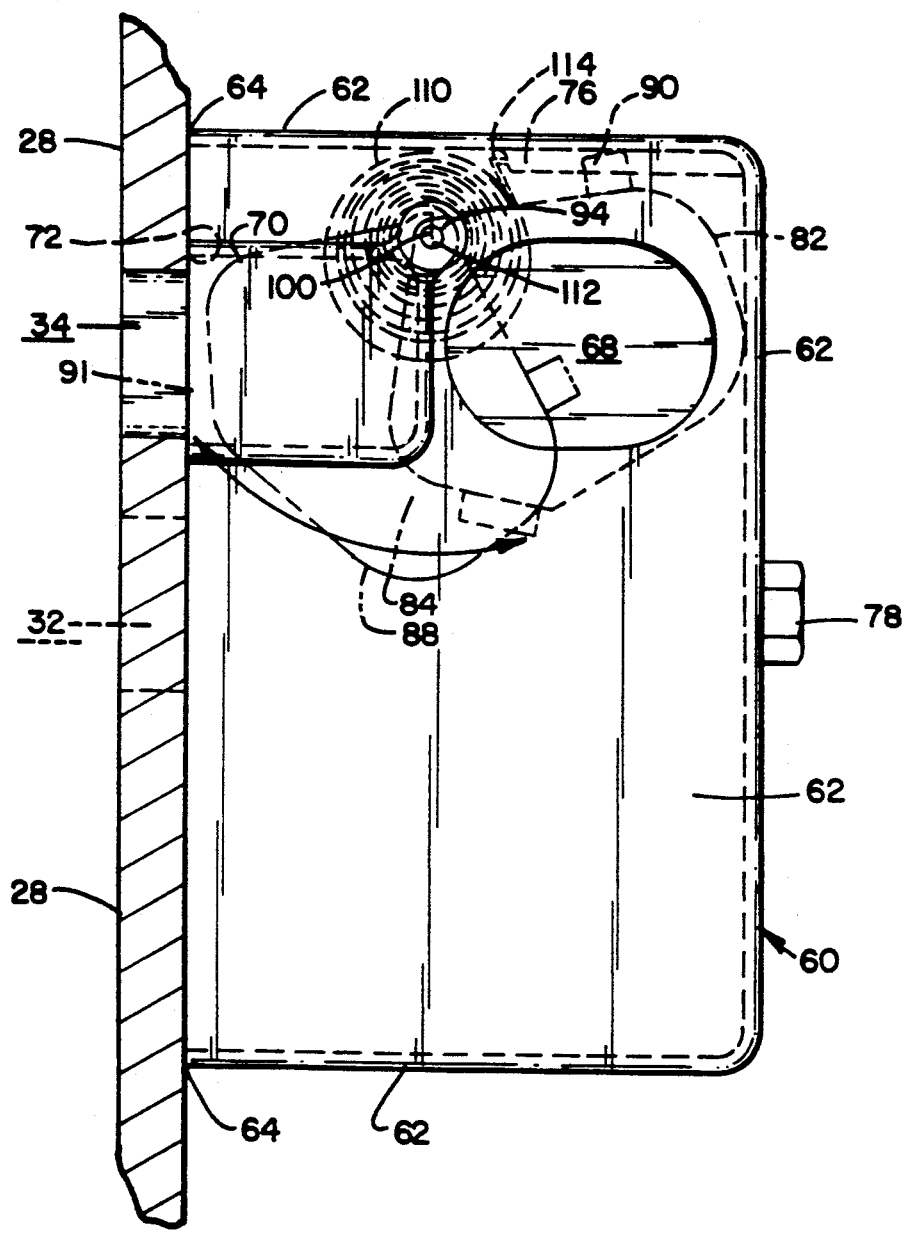
FIG. 5 is an enlarged back view of the portion of the generator set shown in FIG. 4 showing the door in two different positions.

As best shown in FIGS. 4 and 5, a door 82 is provided to vary the relative amounts of ambient air and preheated air entering the carburetor 18. In the preferred embodiment, the ambient air passage 68 and the preheated air passage 72 enter into an interior of housing 62 at a substantially planar portion of the housing 62. The door 82 has a substantially planar major surface 84 which is mounted adjacent to the ambient air passage 68 and the preheated air passage 72. The door 82 has a perimeter defined by an edge 88 surrounding the major surface 84. The edge 88 defines an area which is sufficiently large to obstruct a flow of air entering into an interior of the housing 62 through either the ambient air passage 68 or the preheated air passage 72. The door 82 can be formed from a wide variety of materials including lightweight plastic.

In the preferred embodiment, the door 82 is mounted to the housing 62 for rotational movement about an axis of rotation 86 generally perpendicular to the major surface 84. In this manner, door 82 rotates in the plane formed by the major surface 84 to alternately close and open the ambient air passage 68 and the preheated air passage 72. FIG. 5 illustrates the door in a first position and a second position. In the preferred embodiment, the door is variably positionable between the first position and the second position. In the first position, airflow through the preheated air passage 72 is at a maximum and airflow passing through the ambient air passage 68 is at a minimum, and in the second position airflow passing through the preheated air passage 72 is at a minimum and airflow passing through the ambient air passage 68 is at a maximum. Between the first and second positions, the airflow entering the housing 62 will be mixed. In the preferred embodiment, stops 90,91 are provided protruding from edge 88 to engage the housing 62 and the bulkhead 28, respectively, in either extreme position.

Because the door 82 is mounted for rotation in the plane formed by the major surface 84, a more compact preheater 60 is possible. The door 82 rotates in substantial conformity with the wall of the housing 62 and only a small space is needed to accommodate movement of the door compared to what is required when the axis of rotation is parallel to the door. Further, the axis of rotation 86 is preferably located adjacent the edge 88 of the door 82 to maximize the useful area of the door to obstruct airflow and to minimize the angle of necessary movement from the first position to the second position.

In the preferred embodiment, the door 82 is mounted to the housing 62 with a shaft 94 having a first end 96 which fits into an aperture provided in the housing 62. The door 82 is rigidly mounted to the shaft 94 about a midpoint of the shaft. The longitudinal axis of the shaft 94 coincides with the axis of rotation 86 of the door 82. The door 82 is rotatable about its axis of rotation 86 between the first and second positions by rotating the shaft 94.

Figure 6:
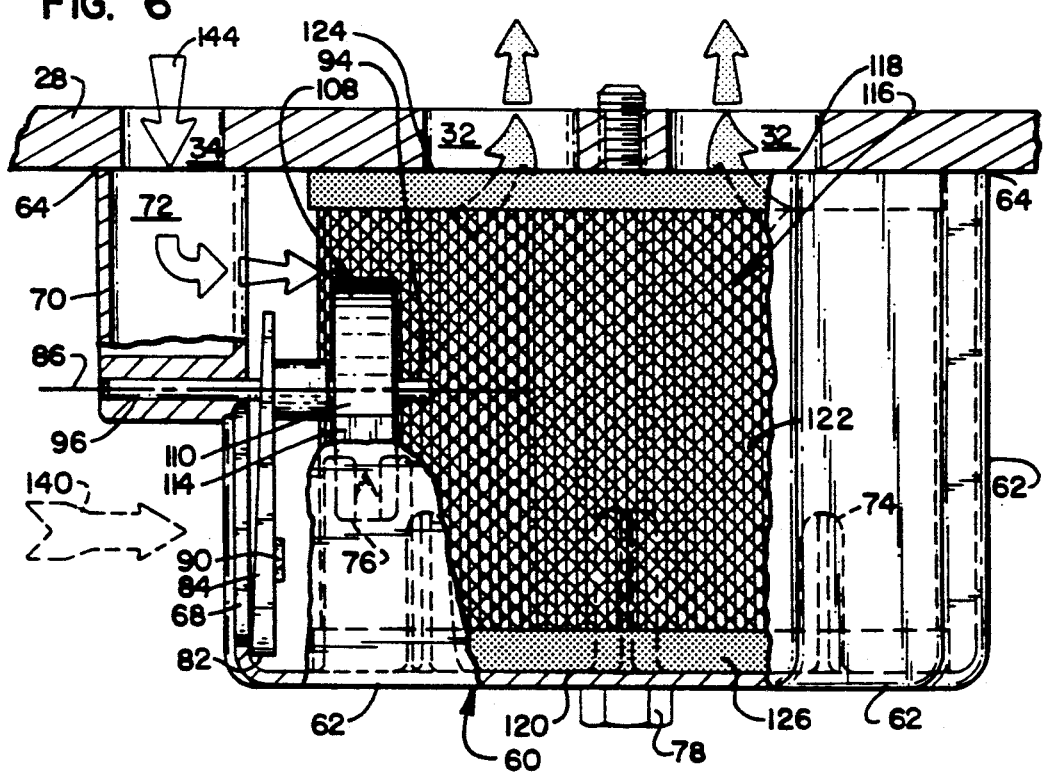
FIG. 6 is an enlarged top view of the portion of the generator set shown in FIG. 4.
Figure 7:
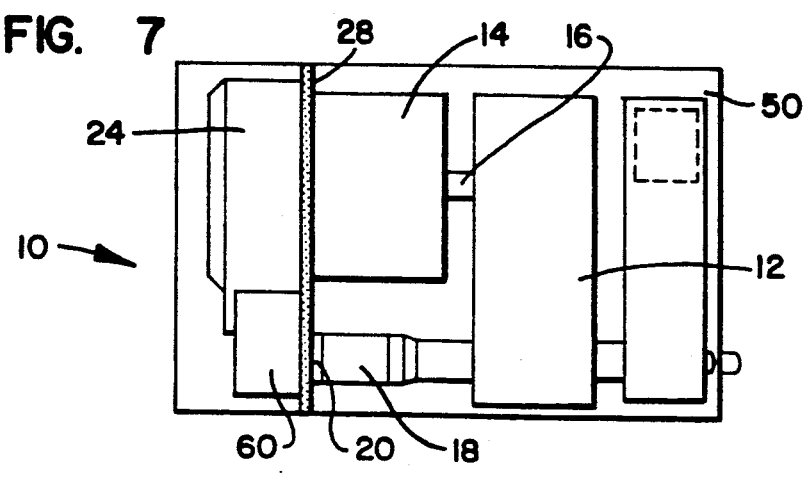
FIG. 7 is a schematic top view of the generator set shown in FIGS. 1-6.

To automatically position the door 82 to regulate the relative amounts of ambient air and preheated air entering the carburetor 18, temperature responsive structure 108 is provided to rotate the shaft 94 to move the door 82. In the preferred embodiment, the temperature responsive structure includes a bimetal spring 110, as shown in FIGS. 4-6. Preferably, the bimetal spring 110 has a coil shape with a first end 112 attached to a second end 98 of shaft 94. As best shown in FIGS. 4 and 5, the first end 112 of the bimetal spring 110 is maintained in a slit 100 provided on shaft 94. A second end 114 of the bimetal spring 110 attaches to housing 62 through a coil receptor 76 which maintains or confines the second end 114 to attach the bimetal spring to the housing 62.

The bimetal spring 110 may be made from any of a wide variety of bimetal thermostatic materials. One suitable material is ASTM TM2 Thermostatic Metal. It is to be appreciated that a wide variety of thermostatic devices besides the bimetal spring 110 shown could be used instead to position the door 82 based on air temperature sensed.

The coiled bimetal spring 110 in the preferred embodiment reacts to temperature changes sensed by changing shape to form a tighter coil shape or a looser coil shape depending whether the temperature increases or decreases. When the bimetal spring 110 changes shape, the first end 112 of the bimetal spring will move to rotate the shaft 94 to move the door 84 toward the first position or toward the second position. As shown in FIGS. 4-6, the bimetal spring 110 of the preferred embodiment is located in the interior of the housing 62 to sense the temperature of the mixed air being supplied to the air inlet 20 of the carburetor 18. In this position, movement of the bimetal spring 110 and door 84 is influenced by preheated air and the amount of mixing of the two air supplies in the interior of the housing 62. It is to be appreciated that the bimetal spring 110 could be located on the exterior of the housing 62 wherein movement of the door would be only a function of ambient air temperature.

In the preferred embodiment, the axis of rotation 86 is located adjacent the edge 88 of the door 82. Further, the axis of rotation 86 is located at a point not coincident with the center of gravity of the door 82. While the door 82 and housing 62 design permits very compact structure, the particular design creates special problems for the design of the bimetal spring 110. The problems arise because the bimetal spring 110 must not only move the door 82 to the proper position but it must also support the moment arm, or torque, created by the center of gravity of the door 82 acting about the axis of rotation 86. In the preferred embodiment, the door 82 hangs downward from its axis of rotation 86, such that its center of gravity is vertically disposed downward from the axis of rotation 86. In the preferred embodiment, the bimetal spring temperature responsive characteristics are taken into account to properly position the door for any given temperature.

In the preferred embodiment, the preheater 60 is also provided with a filter element 116 to filter the air before being supplied to the carburetor 18. The filter element 116 has a cylindrical shaped portion with an open end 118. The open end 118 engages the bulkhead 28 and surrounds the inlet opening 32. Preferably, the open end 118 includes a first seal member 124 for sealing between the filter element 116 and the bulkhead 28. A filter member 122 having an outer surface and an inner surface of metal mesh surrounding a paper filter between the outer and inner surfaces is provided to filter particulate matter from the air passing through the filter member 122. An exterior of the filter member 122 is in airflow communication with the ambient air passage 68 and the preheated air passage 72. An interior of the filter member 122 is in airflow communication with the inlet openings 32 through the bulkhead 28. In this manner, airflow entering the preheater 60 passes through filter member 122 for filtering before entering the carburetor 18.

Preferably, the filter element 116 is also provided with a second open end 120 to form a filter element having a generally uniform cylindrical shape having two open ends. As shown in FIG. 6, the filter element 116 has a second seal member 126 for sealing between the housing 62 and the filter element 116. In the preferred embodiment, the screw 78 which mounts the housing 62 to the bulkhead 28 is tightened such that the filter element 116 is securely positioned between the housing 62 and the bulkhead 28 to form the seals. A plurality of prongs 74 protrude from housing 62 to hold filter element 116 in position. Since the prongs 74 hold the filter element 116 to the housing 62, to assemble the air cleaner, the filter element may be placed into the housing and then the housing attached to the bulkhead 28. The prongs 74 help to assure proper alignment of the filter element 116 with the inlet openings 32. It is to be appreciated that the filter element 122 may be a disposable unit that can be easily replaced once it becomes too filled with particulate matter.

Referring now to FIG. 1, the enclosure assembly 26 is preferably provided with at least one vertical opening 44 having a vertical outer dimension greater than a horizontal outer dimension which forms ambient air inlet 42. As shown in FIG. 1, the ambient air inlet 42 of the preferred embodiment includes a plurality of vertical openings 44 formed in the enclosure assembly 26.

The following example illustrates the manner in which the preheater 60 of the present invention may be employed in connection with the generator set 10. One type of generator set that may be used includes a single cylinder, 4-stroke, air-cooled engine which drives a generator of the two pole, brush type which generates 4 kilowatts of power at 3600 r.p.m. engine speed. It has been found that this generator set performs well if provided with 100% preheated air at temperatures less than approximately 40° F. and 100% ambient air a temperatures greater than approximately 70° F. The preheater 60 operates such that at 40° F. the door 82 is in the first position wherein the flow of preheated air is at a maximum. At 70° F. the door 82 is in the second position wherein the flow of ambient air is at a maximum. Between 40° F. and 70° F., the door 84 is variably positioned between the first and second positions. In the preferred embodiment shown, there is an approximately 3° angle of movement of the door 82 for every degree Fahrenheit temperature change.

During operation, if the bimetal spring 110 senses a decrease in air temperature to a temperature below 70° F., the bimetal spring 110 will react by contracting and rotating the door 82 more toward the first position to provide an increase in the amount of preheated air and a decrease in the amount of ambient air supplied to the engine 12. At a temperature of 40° F. or below, the stop 90 engages housing 62 and the door 82 will be in the first position at which point the amount of preheated air will be at a maximum and the amount of ambient air will be at a minimum. Should the bimetal spring 110 then sense an increase in the air temperature to a temperature greater than 40° F., the bimetal spring 110 will react by expanding and rotating the door 82 toward the second position to provide a decrease in the amount of preheated air and a increase in the amount of ambient air. At a temperature of 70° F. or above, the stop 91 engages bulkhead 28 and the door 82 will be in the second position at which point the amount of ambient air will be at a maximum and the amount of preheated air will be at a minimum. It should be noted that the operating temperature range for the engine 12 described above can be translated up or down or made broader or narrower depending upon the requirements of the particular generator set employed with the preheater 60 of the present invention.

It is to be understood, that even though numerous characteristics and advantages of the invention have been set forth in the foregoing description, together with details of the structure and function of the invention, the disclosure is illustrative only, and changes may be made in detail, especially in matters of shape, size, and arrangement of the parts wherein the principles of the invention to the full extent indicated by the broad general mean of the terms in which the appended claims are expressed.

What is claimed is:

1. An air inlet housing apparatus for regulating the temperature of air supplied to an internal combustion engine, the air inlet housing apparatus comprising:

a housing having a preheated air passage and an ambient air passage passing through a substantially planar portion of the housing to an interior of the housing, the preheated air passage being connectable to a source of preheated air and the ambient air passage being connectable to a source of ambient air, the housing further having air passage outlet means forming an air outlet passage from the interior of the housing, the air passage outlet means being connectable to a carburetor of the engine;

a door mounted to the housing and having a substantially planar major surface adjacent the planar portion of the housing, the door being mounted for rotational movement about an axis of rotation perpendicular to the major surface of the door, the door being variably positionable between a first position wherein airflow through the preheated air passage is at a maximum and airflow through the ambient air passage is at a minimum, and a second position wherein the airflow through the preheated air passage is at a minimum and airflow through the ambient air passage is at a maximum; and temperature responsive means for positioning the door such that the door is moved toward the first position as air temperature sensed decreases and the door is moved toward the second position as the air temperature sensed increases.

2. The air inlet housing apparatus of claim 1 wherein the axis of rotation of the door is located at a point away from a center of gravity of the door along the major surface and the axis of rotation has a generally horizontal orientation when the air inlet housing is associated with the internal combustion engine.

3. The air inlet housing apparatus of claim 2, wherein the axis of rotation is disposed vertically above the center of gravity of the door.

4. The air inlet housing apparatus of claim 2, further comprising a shaft, the shaft mounting the door to the housing wherein the door is rigidly mounted to the shaft and the shaft is rotatably mounted to the housing, the shaft defining the axis of rotation, and the temperature responsive means including a bimetal spring having a coil shape surrounding a portion of the shaft, the bimetal spring having a first end connected to the shaft and a second end connected to the housing.

5. The air inlet housing apparatus of claim 1, wherein the axis of rotation of the door is located adjacent an edge of the major surface of the door and the axis of rotation has a generally horizontal orientation when the air inlet housing is associated with the internal combustion engine.

6. The air inlet housing apparatus of claim 1, wherein the temperature responsive means senses air temperature in the interior of the air inlet housing.

7. The air inlet housing apparatus of claim 6, wherein the temperature responsive means includes a bimetal spring connected to the door and to the housing.

8. An air cleaner preheater apparatus for regulating the temperature of air supplied to an internal combustion engine comprising:

a housing having a preheated air passage and an ambient air passage to an interior of the housing, the ambient air passage being connectable to a source of ambient air, the housing further having an open side wherein the open side is engageable with a bulkhead provided on the engine with the bulkhead having an inlet opening to a carburetor of the engine and a preheated air opening connectable to a source of preheated air, the open side of the housing having a perimeter surrounding the inlet opening and the preheated air opening of the bulkhead, the preheated air passage being in airflow communication with the preheated air opening, the preheated air passage and the ambient air passage opening in airflow communication through the interior of the housing to the inlet opening; and door means for opening and closing the preheated air passage and the ambient air passage.

9. The air cleaner preheater apparatus of claim 8, further comprising temperature responsive means for positioning the door means based on air temperature sensed such that an increased amount of preheated air and a decreased amount of ambient air enters the housing as the temperature sensed decreases, and a decreased amount of preheated air and increased amount of ambient air enters the housing as the temperature sensed increases.

10. The air cleaner preheater apparatus of claim 9, wherein the preheated air passage and the ambient air passage pass through a substantially planar portion of the housing, and the door means includes a door having a substantially planar major surface mounted adjacent to the housing for rotational movement about an axis of rotation perpendicular to the major surface of the door, the door being variably positionable between a first position wherein airflow through the preheated air passage is at a maximum and airflow through the ambient air passage is at a minimum, and a second position wherein the airflow through the preheated air passage is at a minimum and airflow through the ambient air passage is at a maximum.

11. The air cleaner preheater apparatus of claim 10, further comprising a shaft, the shaft mounting the door to the housing wherein the door is rigidly mounted to the shaft and the shaft is rotatably mounted to the housing, the shaft defining the axis of rotation of the door, and the temperature responsive means including a bimetal spring having a coil shape surrounding a portion of the shaft, the bimetal spring having a first end connected to the shaft and a second end connected to the housing.

12. The air cleaner preheater apparatus of claim 11, wherein the door is mounted to the shaft at a point away from a center of gravity of the door along the major surface, and the axis of rotation has a generally horizontal orientation when the air inlet housing is associated with the internal combustion engine.

13. The air cleaner preheater apparatus of claim 12, wherein the axis of rotation is disposed vertically above the center of gravity of the door.

14. The air cleaner preheater apparatus of claim 8, further comprising filter means for cleaning the preheated air and the ambient air passing through the interior of the housing.

15. The air cleaner preheater apparatus of claim 14, wherein the filter means includes a filter element having a hollow cylindrical shape with an open end surrounding the inlet opening, an exterior of the filter element being in airflow communication with the preheated air passage and the ambient air passage, and an interior of the filter element being in airflow communication with the inlet opening wherein airflow through the air cleaner housing passes through the filter element.

16. The air cleaner preheater apparatus of claim 15, wherein the filter element includes seal means for sealing between the open end and the bulkhead.

17. The air cleaner preheater apparatus of claim 16, wherein the filter element includes a second open end opposite the open end adjacent the bulkhead, and seal means for sealing between the second open end and the housing.

18. A generator set comprising:
a mechanically driven generator;
an engine mechanically connected to and driving the generator, the engine including a carburetor having an air inlet;
an enclosure assembly substantially enclosing the generator and the engine, the enclosure assembly having an ambient air inlet from an exterior of the enclosure assembly to an interior of the enclosure assembly, and a heated air outlet from the interior of the enclosure assembly to the exterior of the enclosure assembly;
a bulkhead cooperating with the enclosure assembly to form two compartments in the interior of the enclosure assembly, a first compartment being in airflow communication with the ambient air inlet to the enclosure assembly, and a second compartment being in airflow communication with the heated air outlet from the enclosure assembly, the first compartment containing ambient air and the second compartment containing preheated air during operation;
cooling means for moving a flow of air from the first compartment across the bulkhead to the second compartment; and
air inlet means for supplying varying amounts of ambient air and preheated air to the air inlet to the carburetor, the air inlet means being in airflow communication with the first compartment and the second compartment, the air inlet means having means for varying the relative amounts of ambient air and preheated air entering the air inlet to the carburetor.

19. The generator set of claim 18, wherein the bulkhead includes a preheated air opening to the second compartment and an air inlet opening to the air inlet to the carburetor, and the air inlet means including a housing positioned in the first compartment having an ambient air passage in airflow communication with the first compartment, and an open side engageable with the bulkhead opening and the air inlet opening, the interior of the housing being in airflow communication with the air inlet to the carburetor, the interior of the housing being in airflow communication with the first compartment and the second compartment through the ambient air passage and through the preheated air opening, respectively.

20. The generator set of claim 19, wherein the air inlet means includes temperature responsive means for automatically regulating the means for varying the relative amounts of ambient air and preheated air entering the air inlet to the carburetor based on temperature sensed.

21. The generator set of claim 20, wherein the housing includes a preheated air passage linking the preheated air opening to the interior of the housing, and the means for varying the relative amounts of ambient air and preheated air entering the air inlet to the carburetor including a door mounted to the housing for rotational movement wherein the door is variably positionable between a first position wherein airflow through the preheated air passage is at a maximum and airflow through the ambient air passage is at a minimum and a second position wherein the airflow through the preheated air passage is at a minimum and airflow through the ambient air passage is at a maximum.

22. The generator set of claim 21, wherein the temperature responsive means includes a bimetal spring having a first end connected to the door and the second end connected to the housing.

23. The generator set of claim 18, wherein the cooling means includes a rotatable fan.

24. The generator set of claim 18, wherein the ambient air inlet through the enclosure assembly includes a vertically disposed opening passing through a side surface of the enclosure assembly and having an outer vertical dimension greater than an outer horizontal dimension.

25. The generator set of claim 24, wherein the ambient air inlet includes a plurality of substantially identical vertically disposed openings passing through the side surface of the enclosure assembly.

26. An air preheater system for regulating the temperature of air supplied to a carburetor of an internal combustion engine comprising:

a bulkhead having an inlet opening to the carburetor of the engine and a preheated air opening connectable to a source of preheated air;

a housing having a preheated air passage and an ambient air passage to an interior of the housing, the ambient air passage being connectable to a source of ambient air, the housing further having an open side engageable with the bulkhead, the open side of the housing having a perimeter surrounding the inlet opening and the preheated air opening of the bulkhead, the preheated air passage being in airflow communication with the preheated air opening, the preheated air passage and the ambient air passage being in airflow communication through the interior of the housing to the inlet opening; and door means for opening and closing the preheated air passage and the ambient air passage.

* * * * *

UNITED STATES PATENT AND TRADEMARK OFFICE
CERTIFICATE OF CORRECTION

PATENT NO. : 5,076,247

DATED : December 31, 1991

INVENTOR(S) : Schmidt et al.

It is certified that error appears in the above-identified patent and that said Letters Patent is hereby corrected as shown below:

Column 1, line 53
        DELETE "at" after the word "adjacent".

Column 6, line 13
        INSERT --through-- after the numeral "32".

Column 7, lines 44 and 50
        DELETE "84" and INSERT therefor --82--.

Column 8, line 44
        DELETE "122" and INSERT therefor --116--.

Column 8, line 63
        DELETE "a" and INSERT therefor --at--.

Column 9, line 1
        DELETE "84" and INSERT therefor --82--.

Column 9, line 41
        DELETE "mean" and INSERT therefor --meaning--.

UNITED STATES PATENT AND TRADEMARK OFFICE
CERTIFICATE OF CORRECTION

PATENT NO. : 5,076,247
DATED : December 31, 1991
INVENTOR(S) : Schmidt et al

It is certified that error appears in the above-indentified patent and that said Letters Patent is hereby corrected as shown below:

Column 12, line 24
    INSERT --and having a perimeter surrounding the preheated air-- after the word "bulkhead".

Signed and Sealed this

Third Day of August, 1993

*Attest:*

MICHAEL K. KIRK

*Attesting Officer*     *Acting Commissioner of Patents and Trademarks*